(12) United States Patent
Park (10) Patent No.: US 10,559,804 B2
(45) Date of Patent: Feb. 11, 2020

(54) BATTERY PACK

(71) Applicant: Samsung SDI Co., LTD., Yongin-si, Gyeonggi-do (KR)

(72) Inventor: Han Kyu Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 538 days.

(21) Appl. No.: 15/217,877

(22) Filed: Jul. 22, 2016

(65) Prior Publication Data

US 2017/0040585 A1 Feb. 9, 2017

(30) Foreign Application Priority Data

Aug. 4, 2015 (KR) ........................ 10-2015-0110220

(51) Int. Cl.
*H01M 2/20* (2006.01)
*H01M 2/10* (2006.01)
*H01M 2/30* (2006.01)
*H01R 12/70* (2011.01)
*H01R 12/71* (2011.01)
*H01R 13/426* (2006.01)

(52) U.S. Cl.
CPC .......... *H01M 2/204* (2013.01); *H01M 2/105* (2013.01); *H01M 2/1077* (2013.01); *H01M 2/206* (2013.01); *H01M 2/30* (2013.01); *H01R 12/7088* (2013.01)

(58) Field of Classification Search
CPC .......... H01M 2/20–208; H01M 2/1077; H01R 13/42; H01R 13/432
See application file for complete search history.

(56) References Cited

U.S. PATENT DOCUMENTS

| 2015/0037657 A1* | 2/2015 | Hu ........................ H01M 2/202 429/158 |
| 2016/0164051 A1* | 6/2016 | Cho ....................... H01M 2/204 429/121 |

FOREIGN PATENT DOCUMENTS

| JP | 2010-009796 A | 1/2010 |
| JP | 2014-146483 A | 8/2014 |
| KR | 10-2014-0038036 A | 3/2014 |

* cited by examiner

*Primary Examiner* — Stephan J Essex
(74) *Attorney, Agent, or Firm* — Knobbe, Martens, Olson & Bear, LLP (57) ABSTRACT

A battery pack is disclosed. In one aspect, the battery pack includes first and second cell groups each including one or more cells, a circuit board electrically connected to the first and second cell groups and a connector provided in the circuit board and including a plurality of connector terminals. The connector terminals include first and second connector terminals respectively electrically connected to first and second electrodes of the first cell group. The connector terminals include first and second connector terminals respectively electrically connected to first and second electrodes of the second cell group. The first and third connector terminals are detachably in contact with each other, wherein the second and fourth connector terminals are detachably in contact with each other. According to some embodiments, it is possible to simply physically release a parallel connection of a plurality of cells or a plurality of cell groups.

20 Claims, 6 Drawing Sheets

BATTERY PACK

CROSS-REFERENCE TO RELATED APPLICATION

This application claims priority to and the benefit of Korean Patent Application No. 10-2015-0110220, filed on Aug. 4, 2015, in the Korean Intellectual Property Office, the entire contents of which are incorporated herein by reference in their entirety.

BACKGROUND

Field

The described technology generally relates to a battery pack.

Description of the Related Technology

In general, a secondary cell (e.g., a secondary battery cell) can be charged and discharged multiple times. A secondary cell can be charged by solar energy and other new regeneration energy, as well as an existing power system, such as a power plant, as an energy source. It is used as an energy source for vehicles or large facilities requiring power supply, as well as electronic devices, such as mobile phones, notebook computers, and camcorders.

In order to implement a high-output or high capacity power storage device, multiple secondary cells are connected in series and/or in parallel as necessary for the given application. Further, the power storage device will often include a controller to control charging and/or discharging of the secondary cells and preventing them from being overcharged and/or overdischarged as necessary.

SUMMARY OF CERTAIN INVENTIVE ASPECTS

One inventive aspect relates to a battery pack including a group of secondary battery cells.

Another aspect is a battery pack, in which electrode connector terminals of a plurality of cells or cell groups connected in parallel are in contact with each other so as to be separable from each other.

Another aspect is a battery pack, in which an electrode connector terminal of a cell is combined with a connector housing so as to be separable from the connector housing.

Another aspect is a battery pack, including: a first cell group including one or more cells; a second cell group including one or more cells; a circuit board electrically connected to the first cell group and the second cell group; and a connector provided in the circuit board, and including a plurality of connector terminals.

The plurality of connector terminals may include: a connector terminal 1-1 electrically connected with a first electrode of the first cell group; a connector terminal 1-2 electrically connected with a second electrode of the first cell group; a connector terminal 2-1 electrically connected with a first electrode of the second cell group; and a connector terminal 2-2 electrically connected with a second electrode of the second cell group.

The connector terminal 1-1 and the connector terminal 2-1 may be in contact with each other so as to be physically separable from each other, and the connector terminal 1-2 and the connector terminal 2-2 may be in contact with each other so as to be physically separable from each other.

The connector terminal 1-1 may include a conductive pad which is fixed onto one surface of the circuit board in an exposed state.

The connector terminal 2-1 may include: a connection tab which is convexly bent toward the conductive pad of the connector terminal 1-1, and is in contact with the conductive pad; and a support tab extended from the connection tab, and having elasticity so that the connection tab is separable from the conductive pad.

The connector may further include a connector housing fixed to the circuit board and provided with a tab insertion hole into which the support tab is inserted so as to be separable.

The connector housing may include a fixing protrusion provided on an internal surface of the tab insertion hole, and the support tab may include a fixing recess into which the fixing protrusion is inserted, so that the connector terminal 2-1 may be fixed to the connector housing so as to be separable from the connector housing.

The support tab may include: a first support part extended along an internal surface of the tab insertion hole in a first direction; a tab bent part bent from an end of the first support part in an opposite direction to the first direction; and a second support part extended from the tab bent part along the internal surface of the tab insertion hole in the opposite direction to the first direction.

The tab bent part may be bent in a curved surface shape convexly in the first direction.

The tab insertion hole may be extended in the first direction so as to pass through the connector housing.

The first direction may be a direction parallel to a surface of the conductive pad, which is in contact with the connection tab. The first support part and the second support part may be spaced apart from each other in a second direction, and the second direction may be a direction vertical to the surface of the conductive pad, which is in contact with the connection tab. Otherwise, the second direction may be a direction close to the conductive pad or far away from the conductive pad.

The first support part may be further extended to the outside of the tab insertion hole to be connected with the connection tab. The tab bent part may be connected with the first support part at an opposite side of the connection tab.

The connector housing may include a fixing protrusion provided on the internal surface of the tab insertion hole which is in contact with the second support part, and the second support part may include a fixing recess, which is provided at a location corresponding to the fixing protrusion, and into which the fixing protrusion is inserted.

The second support part may be further extended to the outside of the tab insertion hole.

The connector terminal 2-2 may include a conductive pad which is fixed onto one surface of the circuit board in an exposed state. The conductive pad of the connector terminal 2-2 may be disposed while being spaced apart from the conductive pad of the connector terminal 1-1.

The connector terminal 1-2 may include: a connection tab which is convexly bent toward the conductive pad of the connector terminal 2-2, and is in contact with the conductive pad; and a support tab extended from the connection tab of the connector terminal 1-2, and having elasticity so that the connection tab of the connector terminal 1-2 is separable from the conductive pad of the connector terminal 2-2.

Another exemplary embodiment of the present invention provides a battery pack further including a third cell group including one or more cells. The third cell group may be electrically connected to the circuit board.

The plurality of connector terminals may further include: a connector terminal 3-1 electrically connected with a first electrode of the third cell group; and a connector terminal 3-2 electrically connected with a second electrode of the third cell group.

The connector terminal 3-1 and the connector terminal 1-1 may be in contact with each other so as to be physically separable from each other, and the connector terminal 3-2 and the connector terminal 2-2 are in contact with each other so as to be physically separable from each other.

The connector terminal 3-1 may include: a connection tab which is convexly bent toward the conductive pad of the connector terminal 1-1, is in contact with the conductive pad of the connector terminal 1-1, and is disposed while being spaced apart from the connection tab of the connector terminal 2-1; and a support tab extended from the connection tab of the connector terminal 3-1, and having elasticity so that the connection tab of the connector terminal 3-1 is separable from the conductive pad of the connector terminal 1-1.

The connector terminal 3-2 may include a connection tab which is convexly bent toward the conductive pad of the connector terminal 2-2, is in contact with the conductive pad of the connector terminal 2-2, and is disposed while being spaced apart from the connection tab of the connector terminal 1-2. Further, the connector terminal 3-2 may include a support tab extended from the connection tab of the connector terminal 3-2, and having elasticity so that the connection tab of the connector terminal 3-2 is separable from the conductive pad of the connector terminal 2-2.

At least one cell group among the first to third cell groups may include two or more serially connected cells.

Another aspect is a battery pack, comprising: a first cell group including one or more cells, wherein the first cell group has first and second electrodes opposing each other; a second cell group including one or more cells, wherein the second cell group has first and second electrodes opposing each other; a circuit board electrically connected to the first and second cell groups; and a connector provided in the circuit board and including a plurality of connector terminals, wherein the connector terminals include: a first connector terminal electrically connected to the first electrode of the first cell group; a second connector terminal electrically connected to the second electrode of the first cell group; a third connector terminal electrically connected to the first electrode of the second cell group; and a fourth connector terminal electrically connected to the second electrode of the second cell group, and wherein the first and third connector terminals are detachably in contact with each other, and wherein the second and fourth connector terminals are detachably in contact with each other.

In the battery pack, the first connector terminal includes a conductive pad which is fixed onto a surface of the circuit board in an exposed state, and wherein the third connector terminal includes: a connection tab which is convexly bent toward the conductive pad of the first connector terminal, and is in contact with the conductive pad; and a support tab extending from the connection tab, and having elasticity so that the connection tab is detachable from the conductive pad.

In the battery pack, the connector further includes a connector housing fixed to the circuit board and has a tab insertion hole into which the support tab is inserted so as to be separable. In the battery pack, the connector housing includes a fixing protrusion provided on an internal surface of the tab insertion hole, and wherein the support tab includes a fixing recess into which the fixing protrusion is inserted. In the battery pack, the support tab includes: a first support part extending along an internal surface of the tab insertion hole in a first direction; a tab bent part bent from an end of the first support part in a second direction opposite to the first direction; and a second support part extending from the tab bent part along the internal surface of the tab insertion hole in the second direction.

In the battery pack, the tab bent part has a curved surface shape and is bent convexly in the first direction. In the battery pack, the tab insertion hole extends in the first direction so as to pass through the connector housing. In the battery pack, the first direction is parallel to a surface of the conductive pad, which is in contact with the connection tab, wherein the first and second support parts are spaced apart from each other in a third direction vertical to the surface of the conductive pad, which is in contact with the connection tab. In the battery pack, the first support part further extends to the outside of the tab insertion hole to be connected to the connection tab, and wherein the tab bent part is connected to the first support part at an opposite side of the connection tab.

In the battery pack, the connector housing includes a fixing protrusion provided on the internal surface of the tab insertion hole which is in contact with the second support part, and wherein the second support part includes a fixing recess, which is provided at a location corresponding to the fixing protrusion, and into which the fixing protrusion is inserted. In the battery pack, the second support part further extends to the outside of the tab insertion hole. In the battery pack, the fourth connector terminal includes a conductive pad which is fixed onto a surface of the circuit board in an exposed state, and wherein the conductive pad of the fourth connector terminal is disposed while being spaced apart from the conductive pad of the first connector terminal, and wherein the second connector terminal includes: a connection tab which is convexly bent toward the conductive pad of the fourth connector terminal, and is in contact with the conductive pad; and a support tab extending from the connection tab of the second connector terminal, and having elasticity so that the connection tab of the second connector terminal is detachable from the conductive pad of the fourth connector terminal. In the battery pack, the first cell group includes two or more serially connected cells, and wherein the second cell group includes two or more serially connected cells. In the battery pack, the first and second cell groups are connected in parallel with each other.

Another aspect is a battery pack, comprising: a first cell group including one or more cells, wherein the first cell group has first and second electrodes opposing each other; a second cell group including one or more cells, wherein the second cell group has first and second electrodes opposing each other; a third cell group including one or more cells, wherein the third cell group has first and second electrodes opposing each other; a circuit board electrically connected to the first to third cell groups; and a connector provided in the circuit board and including a plurality of connector terminals, wherein the connector terminals include: a first connector terminal electrically connected to the first electrode of the first cell group; a second connector terminal electrically connected to the second electrode of the first cell group; a third connector terminal electrically connected to the first electrode of the second cell group; a fourth connector terminal electrically connected to the second electrode of the second cell group; a fifth connector terminal electrically connected to the first electrode of the third cell group; and a sixth connector terminal electrically connected to the second electrode of the third cell group, and wherein the first and third connector terminals are detachably in contact with each other, wherein the first and fifth connector terminals are detachably in contact with each other, wherein the second and fourth connector terminals are detachably in contact with each other, and wherein the fourth and sixth connector terminals are detachably in contact with each other.

In the battery pack, the first connector terminal includes a conductive pad which is fixed onto a surface of the circuit board in an exposed state, and wherein the third connector terminal includes: a connection tab which is convexly bent toward the conductive pad of the first connector terminal, and is in contact with the conductive pad of the first connector terminal; and a support tab extending from the connection tab of the third connector terminal, and having elasticity so that the connection tab of the third connector terminal is detachable from the conductive pad of the first connector terminal, and wherein the fifth connector terminal includes: a connection tab which is convexly bent toward the conductive pad of the first connector terminal, is in contact with the conductive pad of the first connector terminal, and is spaced apart from the connection tab of the third connector terminal; and a support tab extending from the connection tab of the fifth connector terminal, and having elasticity so that the connection tab of the fifth connector terminal is detachable from the conductive pad of the first connector terminal.

In the battery pack, the fourth connector terminal includes a conductive pad which is fixed onto one surface of the circuit board in an exposed state, wherein the conductive pad of the fourth connector terminal is spaced apart from the conductive pad of the first connector terminal, wherein the second connector terminal includes: a connection tab which is convexly bent toward the conductive pad of the fourth connector terminal, and is in contact with the conductive pad of the fourth connector terminal; and a support tab extending from the connection tab of the second connector terminal, and having elasticity so that the connection tab of the second connector terminal is detachable from the conductive pad of the fourth connector terminal, and wherein the sixth connector terminal includes: a connection tab which is convexly bent toward the conductive pad of the fourth connector terminal, is in contact with the conductive pad of the fourth connector terminal, and is disposed while being spaced apart from the connection tab of the second connector terminal; and a support tab extending from the connection tab of the sixth connector terminal, and having elasticity so that the connection tab of the sixth connector terminal is detachable from the conductive pad of the fourth connector terminal.

In the battery pack, at least one of the first to third cell groups includes two or more serially connected cells. In the battery pack, the first to third cell groups are connected in parallel with each other. In the battery pack, the third cell group is interposed between the first and second cell groups.

According to at least one of the disclosed embodiments, it is possible to physically release a parallel connection of a plurality of cells or a plurality of cell groups or physically connect a plurality of cells or a plurality of cell groups in a simple and reliable way.

Furthermore, the connector terminals can be connected with the connector housing so as to be separable, so that a combination structure is simplified and the connector terminals are detachable.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Embodiments will be described with reference to the accompanying drawings. However, the present invention is not limited to the embodiments but may be implemented into different forms, and throughout this specification and the claims that follow, when it is described that an element is "connected" to another element, the element may be "directly connected" to the other element or "electrically connected" to the other element through a third element. Further, a part irrelevant to the present invention in the drawing is omitted in order to clarify the description of the present invention, and like reference numerals designate like elements throughout the specification.

The embodiments will be described in detail with reference to the accompanying drawings so that those skilled in the art may easily carry out the present invention. As long as a cell is capable of being charged or discharged, the cell is acceptable as a secondary cell mentioned in the present invention. A cylindrical secondary cell is illustrated in the accompanying drawings, but the spirit of the present invention is not limited thereto, and is applicable to a square or pouch-type cell as a matter of course.

Figure 1:
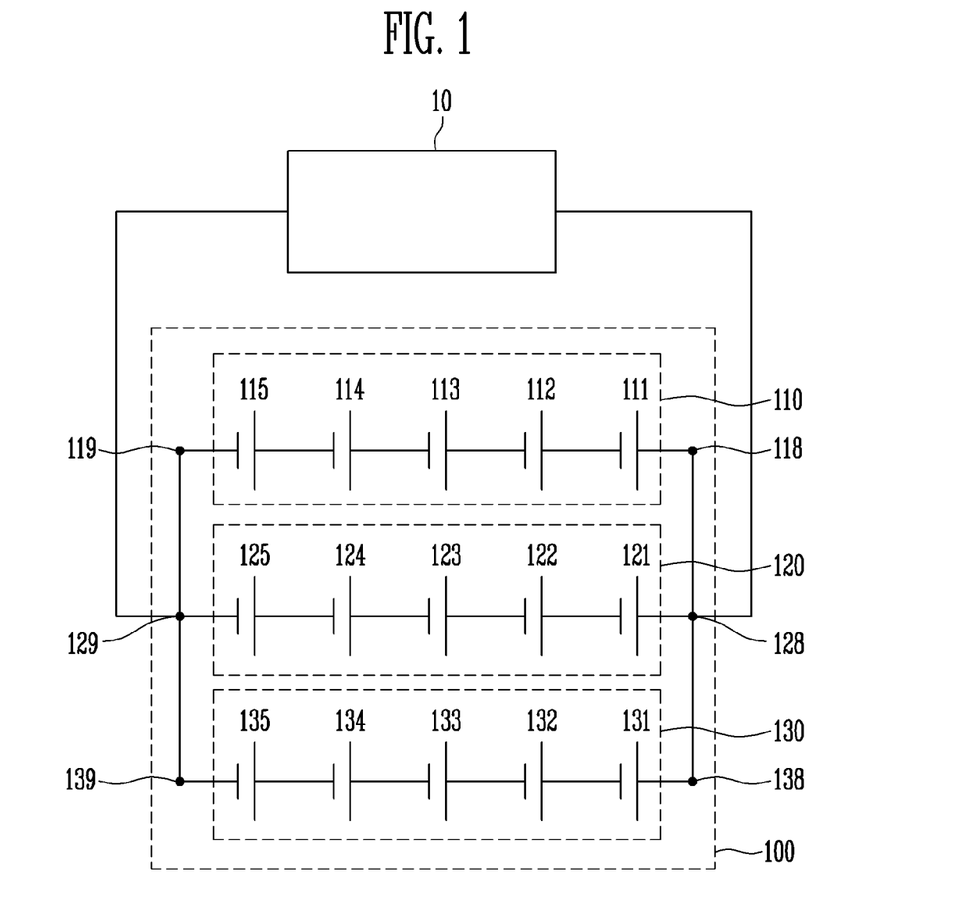
FIG. 1 is a schematic diagram illustrating a state in which a battery pack according to an embodiment of the present invention is connected to an external device.
Figure 2:
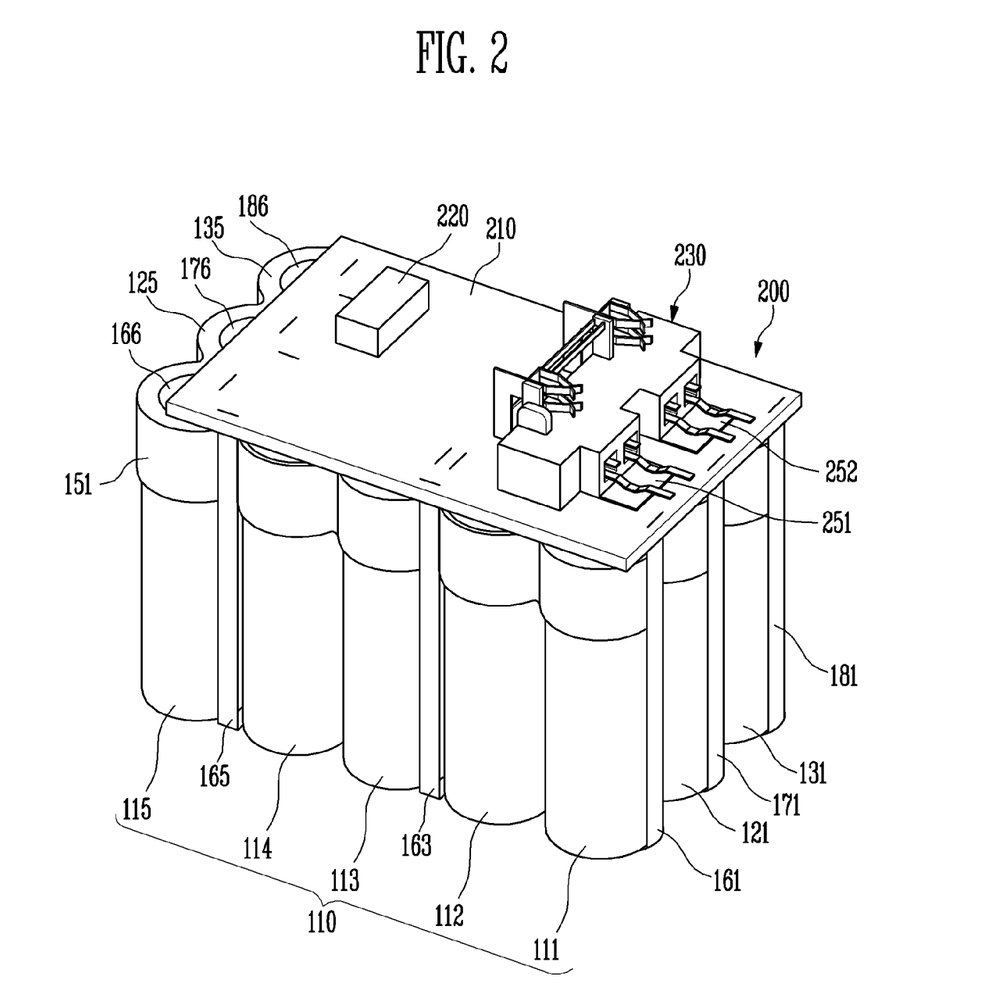
FIG. 2 is a perspective view of the battery pack according to the FIG. 1 embodiment.

FIG. 1 schematically illustrates a connection state of a battery pack 100 including a plurality of cells. In FIG. 1, the battery pack 100 is connected to an external device 10. FIG. 2 is example perspective view of the battery pack 100 of FIG. 1. The battery pack 100 includes a plurality of cell groups 110, 120, and 130, a protection circuit module 200 electrically connected to the cell groups 110-130, and a cell holder 151 that accommodates the cell groups 110-130 and fixing the protection circuit module 200.

The cell groups include a first cell group 110, a second cell group 130, and a third cell group 120. In the present embodiment, the cell groups include three cell groups, but the present invention is not limited thereto, and the cell groups can include two or more cell groups. Further, in the present embodiment, each cell group includes five cells, but the present invention is not limited thereto, and each cell group can include at least one cell group.

The first cell group 110 includes five serially connected cells 111, 112, 113, 114, and 115, and a first electrode 118 and a second electrode 119. The first electrode 118 of the first cell group 110 is a positive electrode in a case where the five cells 111-115 are serially connected, and the second electrode 119 of the first cell group 110 is a negative electrode in a case where the five cells 111-115 are serially connected.

Similarly, the second cell group 130 includes five serially connected cells 111-115, and a first electrode 138 and a second electrode 139. The first electrode 138 and the second electrode 139 of the second cell group 130 are a positive electrode and a negative electrode in a case where the five cells 131, 132, 133, 134, and 135 are serially connected. The third cell group 120 includes five serially connected cells 121, 122, 123, 124, and 125, and a first electrode 128 and a second electrode 129. The first electrode and the second electrode of the third cell group are a positive electrode and a negative electrode in a case where the five cells 121-125 are serially connected.

The first electrode 118 of the first cell group, the first electrode 138 of the second cell group, and the first electrode 128 of the third cell group have the same polarity, and the same polarity is not limited to a positive electrode, and may be a negative electrode. When the first electrode of each cell group is a negative electrode, the second electrode of each cell group is a positive electrode. The second electrode 119 of the first cell group 110, the second electrode 139 of the second cell group 130, and the second electrode 129 of the third cell group 120 have the same polarity. In the present embodiment, the first electrode of each cell group is a positive electrode and the second electrode of each cell group is a negative electrode.

It has been mentioned that the present invention does not exclude a case where the first cell group includes one cell, and when the first cell group includes one cell, a negative electrode and a positive electrode of the cell may be a negative electrode and a positive electrode of the first cell group. This is equally applied to the second cell group and the third cell group.

Figure 3:
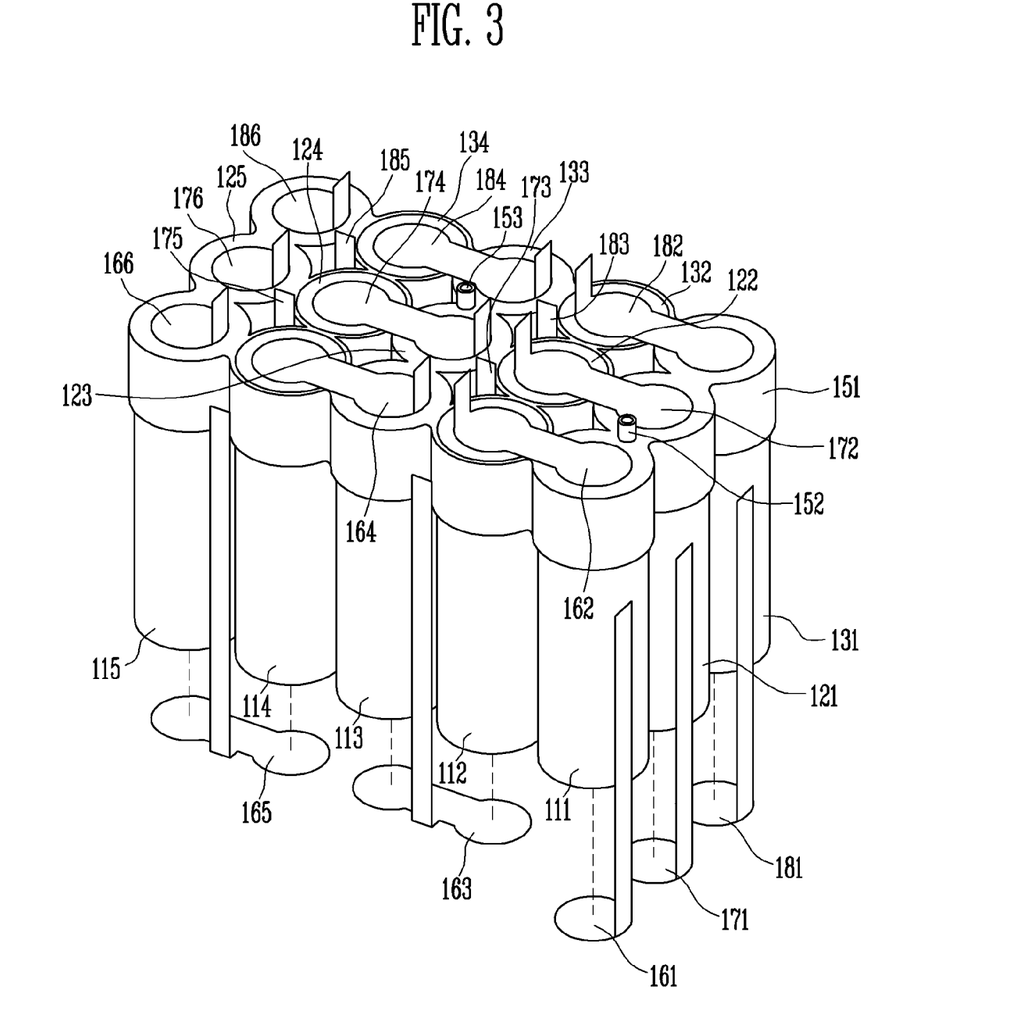
FIG. 3 is a perspective view illustrating a connection configuration of a plurality of cells of the embodiment of FIG. 2.

Referring to FIG. 3, in the first cell group 110, the five cells 111-115 are serially connected to each other by a plurality of lead tabs 161, 162, 163, 164, and 165. The lead tabs 161-165 are in contact with electrode terminals of the respective cells to serially connect the cells. Further, one end of each of the lead tabs 161-165 is inserted into a circuit board 210 to be electrically connected to a conductive pattern (not illustrated) of the circuit board.

The first electrode 118 of the first cell group 110 is connected to a positive electrode lead tab 161 of the first cell group 110, and the second electrode 119 of the first cell group 110 is connected to a negative electrode lead tab 166 of the first cell group 110. One end of each of the positive electrode lead tab 161 of the first cell group 110 and the negative electrode lead tab 166 of the first cell group 110 is inserted into the circuit board 210 to be electrically connected to the conductive pattern (not illustrated) of the circuit board 210 that is electrically connected to a conductive pad 251 (see FIG. 5).

The lead tabs 162, 163, 164, and 165 are not limited to the illustrated configuration, and as long as a configuration enables the cells of the first cell group 110 to be serially connected, the configuration is acceptable. Further, the positive electrode lead tab 161 of the first cell group 110 and the negative electrode lead tab 166 of the first cell group 110 are not limited to the illustrated configuration, and as long as a configuration enables the positive and negative electrodes of the first cell group 110 to be electrically connected to the circuit board, the configuration is acceptable. This is equally applied to lead tabs provided in the second cell group 130 and lead tabs provided in the third cell group 120 to be described below.

In the second cell group 130, the five cells 131, 132, 133, 134, and 135 are serially connected to each other by a plurality of lead tabs 182, 183, 184, and 185. Similarly, in the third cell group 120, the five cells 121, 122, 123, 124, and 125 are serially connected to each other by a plurality of lead tabs 172, 173, 174, and 175.

The first electrode 138 of the second cell group 130 is connected to a positive electrode lead tab 181 of the second cell group 130, and the second electrode 139 of the second cell group 130 is connected to a negative electrode lead tab 186 of the second cell group 130. Further, the first electrode 128 of the third cell group 120 is connected to a positive electrode lead tab 171 of the third cell group 120, and the second electrode 129 of the third cell group 120 is connected to a negative electrode lead tab 176 of the third cell group 120.

The first electrodes 118, 138 and 128 of the first to third cell groups 110, 130 and 120 are electrically connected to each other by the protection circuit module 200, and the second electrodes 119, 139 and 129 of the first to third cell groups 110, 130 and 120 are electrically connected to each other by the protection circuit module 200, so that the first to third cell groups 110, 130 and 120 are connected to each other in parallel as illustrated in FIG. 1. The detailed configuration will be described below.

The cells provided in each of the first to third cell groups 110, 130 and 120 are a secondary cell formed by sealing an electrode assembly, in which a separator is interposed between a first electrode plate and a second electrode plate, in a cylindrical can together with an electrolyte. As long as a cell is capable of reacting with an electrolyte and generating electrochemical energy, the cell is acceptable, and for example, the cell may be a lithium polymer cell or a lithium ion cell. A particular configuration of the batter is publicly known, so that a detailed description thereof will be omitted.

Referring to FIG. 3, the cell holder 151 is a frame, in which cylindrical accommodation parts, into which one end of the cells of each of the first to third cell groups 110, 130 and 120 is inserted, are connected to each other. The cell holder 151 is formed with a hole so that a terminal provided at one end of the cells of each of the first to third cell groups 110, 130 and 120 is exposed.

The cell holder 151 further includes rods 152 and 153 fixed to an upper surface of the cell holder 151 and provided with female screw threads. The rods 152 and 152 may support a lower surface of the circuit board 210, and screws (not illustrated) may be inserted into the female screw threads of the rods 152 and 153 while passing through the circuit board 210 to fix the circuit board 210 to the cell holder 151.

As long as a cell holder is capable of accommodate the cells, and fixing and supporting the protection circuit module 200, the cell holder is acceptable as the cell holder 151.

Figure 4:
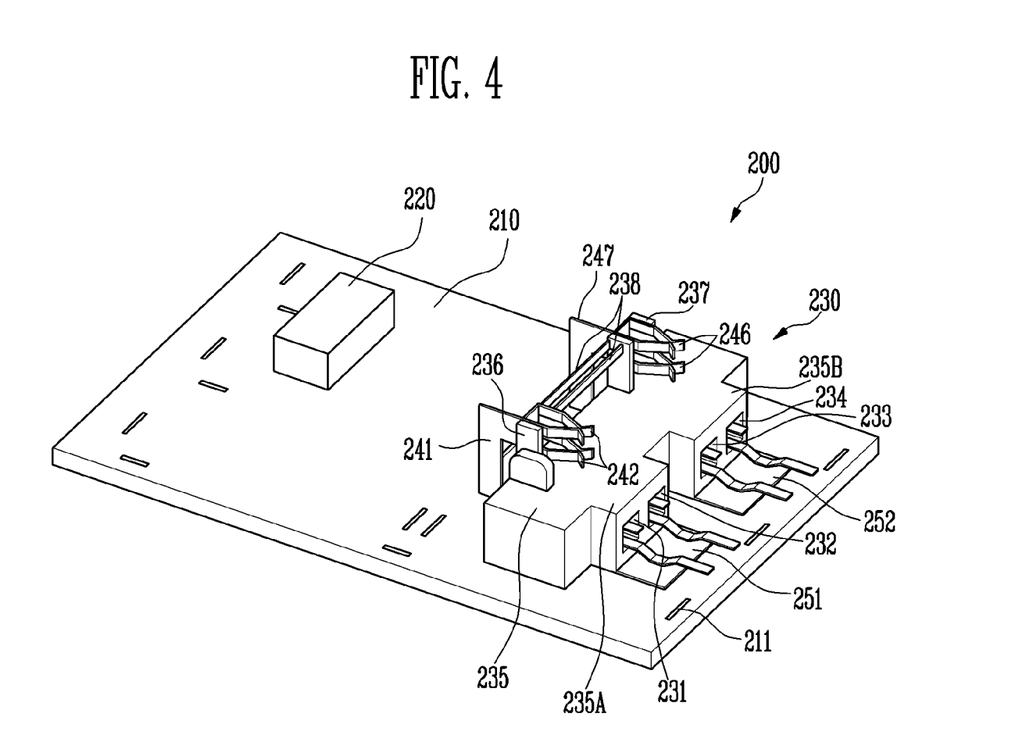
FIG. 4 is a perspective view illustrating a protection circuit module of the embodiment of FIG. 2.

Referring to FIG. 4, the protection circuit module 200 includes the circuit board 210 provided with a conductive pattern (not illustrated), and one or more devices 220 and connectors 230 embedded in the circuit board 210.

The circuit board 210 is provided with a recess 211 into which the positive electrode lead tab 161 of the first cell group 110 is inserted. An end of the positive electrode lead tab 161 of the first cell group 110 may be inserted and welded to the recess 211, so that the positive electrode lead tab 161 of the first cell group 110 may be electrically connected to the conductive pattern of the circuit board 210. Similarly, the circuit board 210 is provided with a plurality of recesses, into which the lead tabs and one end of the positive electrode tab and the negative electrode tab may be inserted.

The one or more devices 220 are electrically connected to the first to third cell groups 110, 130 and 120 through the circuit board 210 to implement a circuit performing one or more predetermined control functions. The control function includes a control related to a management of the cell, such as a control of charging, a control of discharging, and a control of preventing overcharging of the plurality of cells, other safety-related controls, a sensor control, and a control of communication with an external device. Examples of the sensor include a temperature sensor, a voltage sensor, and a current sensor, and the temperature sensor may collect data for controlling safety by the sensor including measuring a temperature of the cell.

The one or more devices 220 which are examples of the circuit performing the control function may configure protection circuits of the plurality of cells. The protection circuit can protect the cell by blocking overcharging, overdischarging, short-circuit, a reverse voltage, and the like, as well as controlling charging and discharging by controlling a voltage or a current of the secondary cell.

For example, in order to configure the protection circuit, the one or more elements 220 may include a field effect transistor (FET), an integrated circuit, a positive temperature coefficient (PTC) element, and a switching element to control charging and discharging and block a circuit.

The connector 230 is configured to be electrically connected to the first and second electrodes of each of the first to third cell groups 110, 130 and 120 to connect the first to third cell groups 110, 130 and 120 to each other in parallel or disconnect the parallel connection of the first to third cell groups 110, 130 and 120. Further, the connector 230 is configured to electrically connect the first and second electrodes of the battery pack to the external device 10. The connector 230 includes a plurality of connector terminals and a connector housing.

The connector terminals include a connector terminal 1-1 or a first connector terminal, a connector terminal 1-2 or a second connector terminal, a connector terminal 2-1 or a third connector terminal, a connector terminal 2-2 or a fourth connector terminal), a connector terminal 3-1 or a fifth connector terminal, and a connector terminal 3-3 or a sixth connector terminal. Each of the connector terminals 1-1-3-3 is electrically connected to the first electrode or the second electrode of the first to third cell groups 110, 130 and 120 through the circuit board 210.

For example, the connector terminal 1-1 is electrically connected to the first electrode 118 of the first cell group 110, and the connector terminal 1-2 is electrically connected to the second electrode 119 of the first cell group 110. The connector terminal 2-1 is electrically connected to the first electrode 138 of the second cell group 130, and the connector terminal 2-2 is electrically connected to the second electrode 139 of the second cell group 130. The connector terminal 3-1 is electrically connected to the first electrode 128 of the third cell group 120, and the connector terminal 3-3 is electrically connected to the second electrode 129 of the third cell group 120.

The connector terminal 1-1 is in contact with the connector terminal 2-1 so as to be physically separable from each other, and is in contact with the connector terminal 3-1 so as to be physically separable from each other. Similarly, the connector terminal 2-2 is in contact with the connector terminal 1-2 so as to be physically separable from each other, and is in contact with the connector terminal 3-2 so as to be physically separable from each other.

In a state where of the connector terminal 1-1 is in contact with all of the connector terminal 2-1 and the connector terminal 3-1, and the connector terminal 2-2 is in contact with all of the connector terminal 1-2 and the connector terminal 3-2, the parallel connection of the first to third cell groups 110, 130 and 120 is maintained. By contrast, in a state where of the connector terminal 1-1 is not in contact with the connector terminal 2-1 and the connector terminal 3-1, and the connector terminal 2-2 is not in contact with the connector terminal 1-2 and the connector terminal 3-2, the parallel connection of the first to third cell groups is blocked.

The connector terminal 1-1 includes a first conductive pad 251 and a pack positive electrode terminal 242. The first conductive pad 251 and the pack positive electrode terminal 242 are electrically connected by a positive electrode lead 241. The first conductive pad 251 is fixed to an upper surface of the circuit board 210 in an exposed state. The first conductive pad 251 is electrically connected to the first electrode 119 of the first cell group 110 through the circuit board 210, through, for example, the electrode lead tab 161 (FIG. 5) and the conductive pattern described above.

The first conductive pad 251 can be a plate-shaped conductor. For convenience of description, a direction parallel to a surface of the first conductive pad is referred to as a first direction, and a direction vertical to a surface of the first conductive pad is referred to as a second direction. The second direction is a direction parallel to an arrow direction illustrated in FIG. 5.

The connector terminal 2-1/261 includes a connection tab 274, which is convexly bent toward the first conductive pad 251 and is in contact with the first conductive pad, and a support tab extended from the connection tab 274 to be fixed to the connector housing. The support tab provides elasticity so that the connection tab 274 is separated from the first conductive pad 251. The connection tab 274 may move in the arrow direction of FIG. 5 by the support tab.

Figure 6:
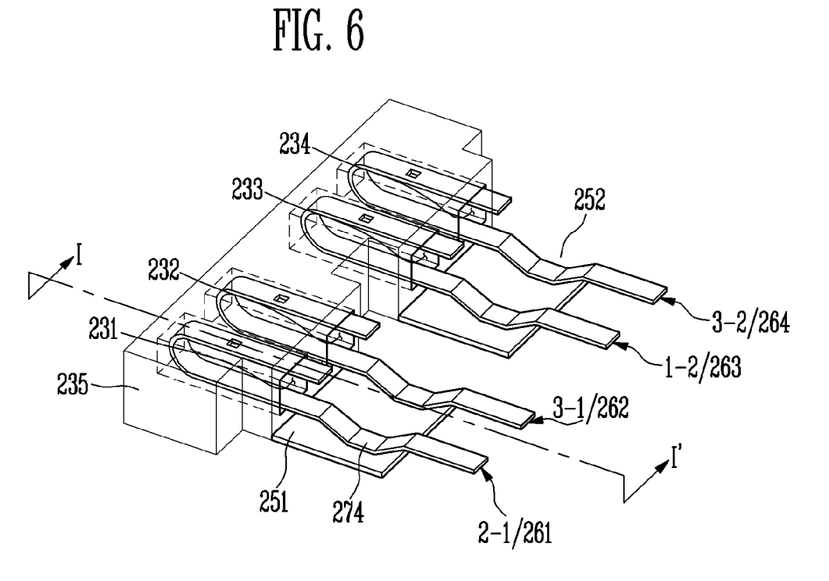
FIG. 6 is a perspective view of a part of a connector included in the protection circuit module of FIG. 4.
Figure 7:
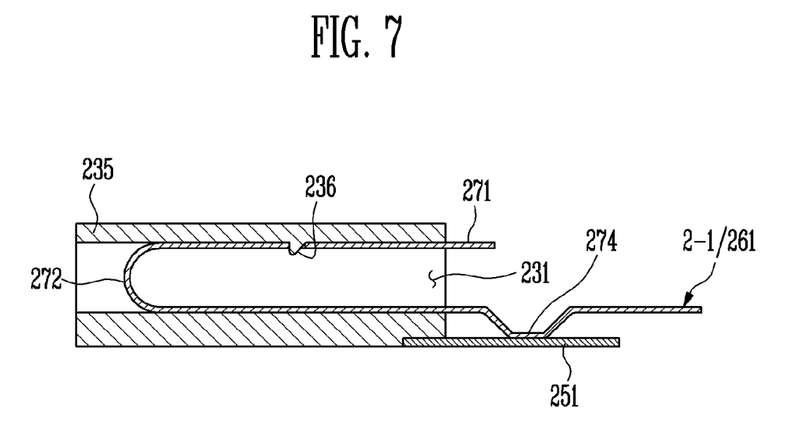
FIG. 7 is a cross-sectional view taken along line I-I' of FIG. 6.
Figure 8:
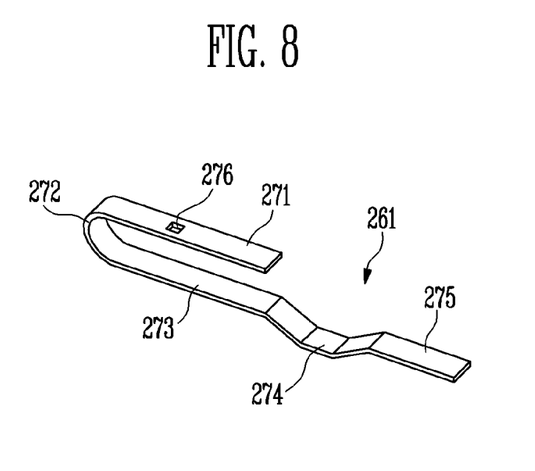
FIG. 8 is a perspective view of a connector terminal 1-1 of the embodiment of FIG. 2.

Referring to FIGS. 6 to 8, the support tab includes a first support part 273 extending from one end of the connection tab 274 in the first direction, a tab bent part 272 bent from the first support part 273 in an opposite direction to the first direction, and a second support part 271 extending from the tab bent part 272 in the opposite direction to the first direction.

Here, the first direction may be substantially parallel to an arrangement direction of the cells 111-115 of the first cell group 110. That is, the first direction may be substantially parallel to a longitudinal direction of the circuit board 210. In this case, the first direction is a direction toward the cell 115 of the first cell group, and the opposite direction to the first direction is a direction toward the cell 111 of the first cell group. However, the first direction is not limited thereto, and as long as a direction is substantially parallel to the surface of the first conductive pad 251, the direction is acceptable as the first direction.

The first support part 273 and the second support part 271 are conductive tabs having substantially the same width as that of the connection tab 274 and are spaced apart from each other in the second direction. The tab bent part 272 is a conductive tab having substantially the same width as those of the first support part 273 and the second support part 271 to connect the first support 273 and the second support part 271. The tab bent part 272 is a curved tab convex in the first direction, and provides elasticity so that the first support part 273 may be bent toward the second support part 271. Accordingly, the connection tab 274 connected to the first support part 273 may move in the arrow direction of FIG. 5 by the tab bent part 272.

The connector housing accommodates the connector terminals, and wires (not shown) connected to the conductive pattern of the circuit board 210 to electrically connect the plurality of connector terminals to the electrodes of the corresponding cell groups, respectively. The connector housing includes a housing body 235, to which the connector terminal 2-1/261, the connector terminal 3-1/262, the connector terminal 1-2/263, and the connector terminal 3-2/264 are fixed, and upper frames 236, 237, and 238 fixing the pack positive electrode terminal 242 and the pack negative electrode terminal 246 on the housing body 235.

The housing body 235 is an insulator having an approximate rectangular parallelepiped shape, and is provided with four tab insertion holes 231, 232, 233, and 234, into which the support tabs of the connector terminal 2-1/261, the connector terminal 3-1/262, the connector terminal 1-2/263, and the connector terminal 3-2/264 are inserted, respectively. Each of the four tab insertion holes 231, 232, 233, and 234 is extended in the first direction while passing through the housing body 235, and an internal surface thereof has an approximate rectangular parallelepiped shape. The four tab insertion holes 231, 232, 233, and 234 are arranged in parallel while being spaced apart from each other in a width direction of the circuit board 210.

The housing body 235 is provided with a positive electrode terminal part 235A and a negative electrode terminal part 235B protruding toward the opposite direction to the first direction. The positive electrode terminal part 235A and the negative electrode terminal part 235B are spaced apart from each other in the width direction of the circuit board 210 to make the connector terminals having different polarities be spatially separated from each other. The positive electrode terminal part 235A is provided with a first tab insertion hole 231, into which the connector terminal 2-1/261 is inserted and a second tab insertion hole 232, into which the connector terminal 3-1/262 is inserted, and the negative electrode terminal part 235B is provided with a third tab insertion hole 233, into which the connector terminal 1-2/263 is inserted and a fourth tab insertion hole 234, into which the connector terminal 3-2/264 is inserted.

The four tab insertion holes 231, 232, 233, and 234 have different locations, but have the same shape, so that a connection relation between the first tab insertion hole 231 and the connector terminal 2-1/262 will be particularly described below.

The first tab insertion hole 231 passes through the housing body 231 from the positive electrode terminal part 235A to an opposite surface of the positive electrode terminal part 235A in the first direction. The first tab insertion hole 231 has one opening at the positive electrode terminal part 235A side and the other opening at the opposite side of the positive electrode terminal part 235A. For convenience of description, the opening provided at the positive electrode terminal part 235A side is referred to as an opening toward the opposite direction to the first direction, and the opening provided at the opposite side of the positive electrode terminal part 235A is referred to as an opening in the first direction.

The first tab insertion hole 231 has the openings at both terminals and an internal surface thereof has an approximate rectangular parallelepiped shape, and the first support part 273 of the connector terminal 2-1/261 is seated on a lower surface of the first tab insertion hole 231, and the second support part 271 of the connector terminal 2-1/261 is seated on an upper surface of the first tab insertion hole 231. The tab bent part 272 of the connector terminal 2-1/261 has a plane surface convexly bent toward the opening toward the first direction of the first tab insertion hole 231.

A fixing protrusion 236 is provided at a ceiling of an internal surface of the first tab insertion hole 231, and the second support part 271 of the connector terminal 2-1/261 is provided with a fixing recess 276 at a position corresponding to the fixing protrusion 236. Referring to FIG. 7, the fixing protrusion 236 has an approximate right-angled triangular cross-sectional shape, which is inclined toward the opening in the opposite direction to the first direction of the first tab insertion hole 231, and is extended toward the opening in the first direction without an inclination. The connector terminal 2-1/261 is inserted into the first tab insertion hole 231 in the first direction from a part of the tab bent part 272 and the fixing protrusion 236 is fitted into the fixing recess 276, so that the connector terminal 2-1/261 is fixed to the connector housing.

The second support part 271 is further extended to the outside of the first tab insertion hole 231, so that when an end of the second support part 271 is pressed, the fixing protrusion 236 may be separated from the fixing recess 276. Accordingly, by the aforementioned configuration, the connector terminal 2-1/261 may be simply assembled with and separated from the connector housing.

In the same manner, the connector terminal 3-1/262, the connector terminal 1-2/263, and the connector terminal 3-2/264 are inserted and fixed to the second to fourth tab insertion holes 232, 233, and 234, respectively. The connection tab of each of the connector terminal 2-1/261 and the connector terminal 2-2/262 is exposed to the outside of the tab insertion hole from the positive electrode terminal part 235A, and the connection tab of each of the connector terminal 1-2/263 and the connector terminal 3-2/264 is exposed to the outside of the tab insertion hole from the negative electrode terminal part 235B.

The connector terminal 3-1/262 is disposed while being spaced apart from the connector terminal 2-1/261. The connector terminal 3-1/262 includes a connection tab, which is convexly bent toward the first conductive pad 251 and is in contact with the first conductive pad, and a support tab extended from the connection tab to be fixed to the connector housing. A detailed configuration of the connector terminal 3-1/262 is the same as that of the connector terminal 2-1/261 described with reference to FIG. 8.

Referring to FIG. 7, the first conductive pad 251 is disposed so as to partially overlap a lower surface of the positive electrode terminal part 235A, and has substantially the same with as a length in a width direction of the positive electrode terminal part 235A. However, the first conductive pad 251 is not limited, and the first conductive pad 251 can have an area to the extent that the first conductive pad 251 is in contact with the connection tab of each of the connector terminal 2-1 261 and the connector terminal 3-1 262. Further, if the first conductive pad 251 is disposed to be adjacent to the positive electrode terminal part 235A, the first conductive pad 251 can contact the connection tab of each of the connector terminal 2-1 261 and the connector terminal 3-1/262, and the first conductive pad 251 may not overlap the lower surface of the connector housing.

The connector terminal 2-2 includes a second conductive pad 252 and a pack negative electrode terminal 246. The second conductive pad 252 and the pack negative electrode terminal 246 are electrically connected by a negative electrode lead 247. The second conductive pad 251 is fixed in a state of being exposed to the upper surface of the circuit board 210, and is disposed while being spaced apart from the first conductive pad 251 in the width direction of the circuit board. The second conductive pad 252 is electrically connected to the second electrode 139 of the second cell group through the circuit board 210. The second conductive pad 252 is a plate-shaped conductor.

The second conductive pad 252 may be disposed so as to partially overlap a lower surface of the negative electrode terminal part 235B, and has substantially the same width as a length in a width direction of the negative electrode terminal part 235B. However, the second conductive pad 252 is not limited, and the second conductive pad 252 can have an area to the extent that the second conductive pad 262 is in contact with the connection tab of each of the connector terminal 1-2/263 and the connector terminal 3-2/264. Further, if the second conductive pad 252 is disposed to be adjacent to the negative electrode terminal part 235B, the second conductive pad 252 may be in contact with the connection tab of each of the connector terminal 1-2/263 and the connector terminal 3-2/264, and the second conductive pad 252 may not overlap the lower surface of the connector housing.

Each of the connector terminal 1-2/263 and the connector terminal 3-2/264 includes a connection tab convexly bent toward the second conductive pad 262 and a support tab extended from the connection tab and fixed to the connector housing. Detailed configurations of the connector terminal 1-2/263 and the connector terminal 3-2/264 are the same as that of the connector terminal 2-1/261 described with reference to FIG. 8, so that a detailed description thereof will be omitted.

Figure 5:
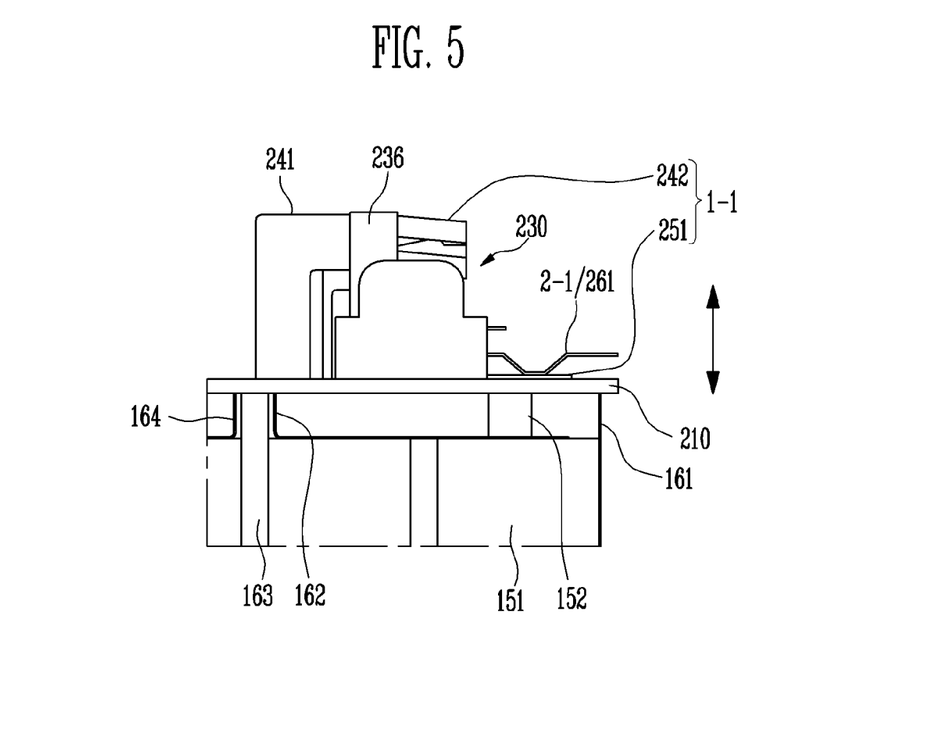
FIG. 5 is a lateral view of a surrounding region of a connector of the embodiment of FIG. 2.

The connector terminal 2-1/261 and the connector terminal 3-1/262 may move in the arrow direction of FIG. 5, so that each connection tab may be separated from or be in contact with the first conductive pad 251. Similarly, the connector terminal 1-2/263 and the connector terminal 3-2/264 may move in the arrow direction of FIG. 5, so that each connection tab may be separated from or be in contact with the second conductive pad 252.

In a state where the connector terminal 2-1/261 and the connector terminal 3-1/262 are in contact with the first conductive pad 251, and the connector terminal 1-2/263 and the connector terminal 3-2/264 are in contact with the second conductive pad 252, the first to third cell groups 110, 130, and 120 are connected in parallel as illustrated in FIG. 1.

When the connector terminal 2-1/261 and the connector terminal 3-1/262 are separated from the first conductive pad 251, and the connector terminal 1-2/263 and the connector terminal 3-2/264 are separated from the second conductive pad 252, the parallel connection of the first to third cell groups 110, 130, and 120 is released. For example, when an insulator is inserted between the first conductive pad 251 and the connector terminal 2-1/261 and the connector terminal 3-1/262 and an insulator is inserted between the second conductive pad 252 and the connector terminal 1-2/263 and the connector terminal 3-2/264, the parallel connection of the cell groups may be released.

Referring to FIG. 8, the connector terminal 2-1 may further include a guide part 275 further extended from an end of the connection tab 274 in the opposite direction to the first direction. The guide part may not be provided as necessary. When the insulator is desired to be inserted between the connection tab 274 of the connector terminal 2-1/261 and the first conductive pad 251, the guide part 275 may guide the insulator. Otherwise, when a separate member is connected to the guide part 275 and the guide part 275 is pulled in an upper direction, that is, a direction far away from the first conductive pad 251, the connection tab 274 may also be separated from the first conductive pad 251.

The guide part 275 may be identically provided to the connector terminal 3-1/262, the connector terminal 1-2/263, and the connector terminal 3-2/264.

The upper frame provided on the upper surface of the housing body 235 includes a pair of frame pillars 236 and 237 and a horizontal frame 238 extended to as to connect the pair of frame pillars 236 and 237. The pair of frame pillars 236 and 237 are spaced apart from each other in the width direction of the circuit board to be provided at both ends, respectively. The horizontal frame 238 is extended from one frame pillar 236 to the other frame pillar 237, and the pack positive electrode terminal 242 and the pack negative electrode terminal 246 are fixed to the horizontal frame 238.

The pack positive electrode terminal 242 and the pack negative electrode terminal 246 have a conductive clip shape, and may be engaged with a connector of the external device 10 to supply power to the external device. Otherwise, the pack positive electrode terminal 242 and the pack negative electrode terminal 246 may be electrically connected to an external power supply device, so that the first to third cell groups 110, 130, and 120 may also be charged.

According to another embodiment, a plurality of cell groups include a first cell group 110 and a second cell group 120, and a plurality of connector terminals may also include a connector terminal 1-1, a connector terminal 1-2/263, a connector terminal 2-1/261, and a connector terminal 2-2. That is, in the exemplary embodiment of FIG. 2, the connector terminal 3-1/262 and the connector terminal 3-2/264 electrically connected to the first electrode 128 and the second electrode 129 of the third cell group 120, respectively, may also be omitted. In this case, the number of cell groups, in which five cells are serially connected, is two, and the two cell groups are connected to each other in parallel. Even in this case, the first conductive pad 251 is separated from the connector terminal 2-1/261 and the second conductive pad 252 is separated from the connector terminal 1-2/263, so that the parallel connection of the first cell group 110 and the second cell group 130 may be released as described above.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a first cell group including one or more cells, wherein the first cell group has first and second electrodes opposing each other;
a second cell group including one or more cells, wherein the second cell group has first and second electrodes opposing each other;
a circuit board electrically connected to the first and second cell groups; and
a connector provided in the circuit board and including a plurality of connector terminals,
wherein the connector terminals include:
a first connector terminal electrically connected to the first electrode of the first cell group;
a second connector terminal electrically connected to the second electrode of the first cell group;
a third connector terminal electrically connected to the first electrode of the second cell group; and
a fourth connector terminal electrically connected to the second electrode of the second cell group, and
wherein the first and third connector terminals are configured to be electrically connected with or disconnected from each other, wherein the second and fourth connector terminals are configured to be electrically connected with or disconnected from each other, wherein when the first and third connector terminals are electrically connected with each other, they are in contact with each other, and wherein when the second and fourth connector terminals are electrically connected with each other, they are in contact with each other.

2. The battery pack of claim 1, wherein the first connector terminal includes a conductive pad which is fixed onto a surface of the circuit board in an exposed state, and wherein the third connector terminal includes:
a connection tab which is convexly bent toward the conductive pad of the first connector terminal, and is in contact with the conductive pad; and
a support tab extending from the connection tab, and having elasticity so that the connection tab is detachable from the conductive pad.

3. The battery pack of claim 2, wherein the connector further includes a connector housing fixed to the circuit board and has a tab insertion hole into which the support tab is inserted so as to be separable.

4. The battery pack of claim 3, wherein the connector housing includes a fixing protrusion provided on an internal surface of the tab insertion hole, and wherein the support tab includes a fixing recess into which the fixing protrusion is inserted.

5. The battery pack of claim 3, wherein the support tab includes:
a first support part extending along an internal surface of the tab insertion hole in a first direction;
a tab bent part bent from an end of the first support part in a second direction opposite to the first direction; and
a second support part extending from the tab bent part along the internal surface of the tab insertion hole in the second direction.

6. The battery pack of claim 5, wherein the tab bent part has a curved surface shape and is bent convexly in the first direction.

7. The battery pack of claim 5, wherein the tab insertion hole extends in the first direction so as to pass through the connector housing.

8. The battery pack of claim 5, wherein the first direction is parallel to a surface of the conductive pad, which is in contact with the connection tab, wherein the first and second support parts are spaced apart from each other in a third direction vertical to the surface of the conductive pad, which is in contact with the connection tab.

9. The battery pack of claim 8, wherein the first support part further extends to the outside of the tab insertion hole to be connected to the connection tab, and wherein the tab bent part is connected to the first support part at an opposite side of the connection tab.

10. The battery pack of claim 9, wherein the connector housing includes a fixing protrusion provided on the internal surface of the tab insertion hole which is in contact with the second support part, and wherein the second support part includes a fixing recess, which is provided at a location corresponding to the fixing protrusion, and into which the fixing protrusion is inserted.

11. The battery pack of claim 9, wherein the second support part further extends to the outside of the tab insertion hole.

12. The battery pack of claim 2, wherein the fourth connector terminal includes a conductive pad which is fixed onto a surface of the circuit board in an exposed state, and
wherein the conductive pad of the fourth connector terminal is disposed while being spaced apart from the conductive pad of the first connector terminal, and
wherein the second connector terminal includes:
a connection tab which is convexly bent toward the conductive pad of the fourth connector terminal, and is in contact with the conductive pad; and
a support tab extending from the connection tab of the second connector terminal, and having elasticity so that the connection tab of the second connector terminal is detachable from the conductive pad of the fourth connector terminal.

13. The battery pack of claim 1, wherein the first cell group includes two or more serially connected cells, and wherein the second cell group includes two or more serially connected cells.

14. The battery pack of claim 1, wherein the first and second cell groups are connected in parallel with each other.

15. A battery pack, comprising:
a first cell group including one or more cells, wherein the first cell group has first and second electrodes opposing each other;
a second cell group including one or more cells, wherein the second cell group has first and second electrodes opposing each other;
a third cell group including one or more cells, wherein the third cell group has first and second electrodes opposing each other;
a circuit board electrically connected to the first to third cell groups; and
a connector provided in the circuit board and including a plurality of connector terminals,
wherein the connector terminals include:
a first connector terminal electrically connected to the first electrode of the first cell group;
a second connector terminal electrically connected to the second electrode of the first cell group;
a third connector terminal electrically connected to the first electrode of the second cell group;
a fourth connector terminal electrically connected to the second electrode of the second cell group;
a fifth connector terminal electrically connected to the first electrode of the third cell group; and a sixth connector terminal electrically connected to the second electrode of the third cell group, and wherein the first and third connector terminals configured to be electrically connected with or disconnected from each other, wherein the first and fifth connector terminals are configured to be electrically connected with or disconnected from each other, wherein the second and fourth connector terminals are configured to be electrically connected with or disconnected from each other, wherein the fourth and sixth connector terminals are configured to be electrically connected with or disconnected from each other, wherein when the first and third connector terminals are electrically connected with each other, they are in contact with each other, and wherein when the second and fourth connector terminals are electrically connected with each other, they are in contact with each other.

16. The battery pack of claim 15, wherein the first connector terminal includes a conductive pad which is fixed onto a surface of the circuit board in an exposed state, and wherein the third connector terminal includes:
a connection tab which is convexly bent toward the conductive pad of the first connector and is in contact with the conductive pad of the first connector terminal; and
a support tab extending from the connection tab of the third connector terminal, and having elasticity so that the connection tab of the third connector terminal is detachable from the conductive pad of the first connector terminal, and wherein the fifth connector terminal includes:
a connection tab which is convexly bent toward the conductive pad of the first connector terminal, is in contact with the conductive pad of the first connector terminal, and is spaced apart from the connection tab of the third connector terminal; and
a support tab extending from the connection tab of the fifth connector terminal, and having elasticity so that the connection tab of the fifth connector terminal is detachable from the conductive pad of the first connector terminal.

17. The battery pack of claim 16, wherein the fourth connector terminal includes a conductive pad which is fixed onto one surface of the circuit board in an exposed state, wherein the conductive pad of the fourth connector terminal is spaced apart from the conductive pad of the first connector terminal, wherein the second connector terminal includes:
a connection tab which is convexly bent toward the conductive pad of the fourth connector terminal, and is in contact with the conductive pad of the fourth connector terminal; and
a support tab extending from the connection tab of the second connector terminal, and having elasticity so that the connection tab of the second connector terminal is detachable from the conductive pad of the fourth connector terminal, and wherein the sixth connector terminal includes:
a connection tab which is convexly bent toward the conductive pad of the fourth connector terminal, is in contact with the conductive pad of the fourth connector terminal, and is disposed while being spaced apart from the connection tab of the second connector terminal; and
a support tab extending from the connection tab of the sixth connector terminal, and having elasticity so that the connection tab of the sixth connector terminal is detachable from the conductive pad of the fourth connector terminal.

18. The battery pack of claim 15, wherein at least one of the first to third cell groups includes two or more serially connected cells.

19. The battery pack of claim 15, wherein the first to third cell groups are connected in parallel with each other.

20. The battery pack of claim 15, wherein the third cell group is interposed between the first and second cell groups.

* * * * *